United States Patent
Carreras

(10) Patent No.: US 7,270,472 B2
(45) Date of Patent: Sep. 18, 2007

(54) RESONANT SHAKING

(75) Inventor: Ricardo F. Carreras, Southborough, MA (US)

(73) Assignee: Bose Corporation, Framingham, MA (US)

( * ) Notice: Subject to any disclaimer, the term of this patent is extended or adjusted under 35 U.S.C. 154(b) by 388 days.

(21) Appl. No.: 11/063,367

(22) Filed: Feb. 23, 2005

(65) Prior Publication Data

US 2006/0187743 A1 Aug. 24, 2006

(51) Int. Cl.
*B01F 11/00* (2006.01)
(52) U.S. Cl. .................... 366/111; 366/116; 366/212; 366/601
(58) Field of Classification Search ........ 366/110–114, 366/116, 208–212, 216, 601
See application file for complete search history.

(56) References Cited

U.S. PATENT DOCUMENTS

| 4,610,546 | A | 9/1986 | Intraub |
|---|---|---|---|
| 5,033,321 | A | 7/1991 | Gerson |
| 5,427,451 | A | 6/1995 | Schmidt |
| 5,624,185 | A | 4/1997 | Whisson |
| 5,639,160 | A | 6/1997 | Kishimoto |
| 5,821,657 | A | 10/1998 | Falconer et al. |
| 5,921,676 | A | 7/1999 | Reynolds et al. |
| 6,491,422 | B1 | 12/2002 | Rutten et al. |
| 6,579,002 | B1 * | 6/2003 | Bartick et al. |
| 6,659,637 | B2 | 12/2003 | Friedman |
| 2002/0118594 | A1 | 8/2002 | Vellinger et al. |
| 2005/0152216 | A1* | 7/2005 | Friedman |
| 2006/0187743 | A1* | 8/2006 | Carreras |

FOREIGN PATENT DOCUMENTS

| FR | 2588771 | * | 4/1987 |
| WO | WO95/04591 | | 2/1995 |

\* cited by examiner

*Primary Examiner*—Charles E. Cooley
(74) *Attorney, Agent, or Firm*—Fish & Richardson P.C.

(57) ABSTRACT

A resonant shaker includes a support tray for supporting a target carrier. A sensor generates an electrical signal that is related to an acceleration of the support tray. A linear drive motor includes an armature that is coupled to the support tray. The linear drive motor provides an oscillating drive force to the support tray in response to a drive current applied to the linear drive motor. The resonant shaker also includes a controller. The controller receives the electrical signal from the sensor and a drive signal that is related to the drive current. The controller transmits a modified drive current to the linear drive motor in response to a predetermined phase relationship between the electrical signal and the drive signal.

46 Claims, 6 Drawing Sheets

RESONANT SHAKING

BACKGROUND OF THE INVENTION

Processing materials, such as biological materials or chemical materials often requires the mixing of these materials within a container. The container can be a test tube or beaker, for example. A rack that supports multiple containers is sometimes used when mixing batches of materials. Mixing can be achieved by shaking the container or by using a stirring rod or impeller immersed in the material. Some mixers use a coated magnet placed inside the container. The coated magnet is magnetically driven in a rotary motion to mix the contents of the container. Non-invasive mixers, such as shakers, can be advantageous because they do not introduce stirrers, mixing blades, or other mechanical devices into direct contact with the materials to be mixed, thus avoiding potential contamination of those materials by the blades or other mechanical devices.

SUMMARY OF THE INVENTION

In one aspect, the invention is embodied in a resonant shaker. The resonant shaker includes a support tray for supporting a target carrier. A sensor generates an electrical signal that is related to an acceleration of the support tray. The sensor can be attached to the support tray. A linear drive motor includes an armature that is coupled to the support tray. The linear drive motor provides an oscillating drive force to the support tray in response to a drive current applied to the linear drive motor. The resonant shaker also includes a controller. The controller receives the electrical signal from the sensor and a drive signal that is related to the drive current. The controller transmits a modified drive current to the linear drive motor in response to a predetermined phase relationship between the electrical signal and the drive signal.

The linear drive motor can provide a reciprocating motion to the support tray. The target carrier can be a bioreactor chamber. Alternatively, the support tray can be integrated with a bioreactor. The target carrier can be a beaker, a test tube, and a multiple tube rack. The target carrier can contain a specimen including a chemical material, a biological material, a cell culture, a tissue, and a tissue construct. The specimen can include a particulate substance, a slurry, and a fluid.

The armature of the linear drive motor can be coupled to the support tray through an elastic element. In this configuration, the predetermined phase relationship is an absolute value of a difference in phase between the electrical signal and the drive signal of substantially ninety-degrees. Alternatively, the armature can be coupled to the support tray through a rigid coupling. An elastic element can be coupled between the support tray and a housing of the linear drive motor. In this configuration, the predetermined phase relationship is an absolute value of a difference in phase between the electrical signal and the drive signal of substantially zero-degrees.

In one configuration, the desired shaking frequency of the specimen causes the combination at least two materials. In one configuration, the desired shaking frequency of the specimen causes the separation of at least two materials. The desired shaking frequency can be a resonant frequency of movable elements of the resonant shaker.

The elastic element can be a grommet, a torsional spring, a coil spring, a leaf spring, a disc spring, an elliptical spring, a helical spring, an air spring, or a cantilever spring.

In one aspect, the controller controls at least one of a frequency and an amplitude of an oscillation of the armature of the linear drive motor. An amplitude of a modified drive current applied to the linear drive motor displaces the armature of the linear drive motor by a predetermined amount. A phase detector can be integrated with the controller.

The controller can adjust a frequency of the drive current in response to the predetermined phase relationship between the electrical signal and the drive signal. The controller can modify at least one of a frequency and an amplitude of the drive current based on a measure of viscosity of the specimen.

The sensor can be attached to the support tray, the armature, or the target carrier. The sensor can be a position sensor, a velocity sensor, a jerk sensor, or an accelerometer. In addition to acceleration, the electrical signal from the sensor can be related to at least one of a displacement of the support tray, a velocity of the support tray, and a jerk of the support tray. The sensor can be an optical sensor.

In another aspect, the invention is embodied in a method of shaking using a resonant shaker. The method includes oscillating a support tray of the resonant shaker with a linear drive motor that is driven by a drive current and generating a drive signal that is related to the drive current. The method further includes generating an electrical signal that is related to an acceleration of the support tray. The drive current is modified in response to a predetermined phase relationship between the electrical signal and the drive signal to generate a modified drive current. The linear drive motor is driven with the modified drive current to oscillate the support tray. The support tray can be oscillated at a resonant frequency of the system. The method can further include loading a target carrier containing the specimen onto the support tray of the resonant shaker.

The modified drive current can control an amplitude of an oscillation and/or a frequency of an oscillation of the support tray. The support tray can be displaced by a predetermined amount.

The support tray can be coupled to the linear drive motor through an elastic element. In this configuration, the predetermined phase relationship is an absolute value of a difference in phase between the electrical signal and the drive signal of substantially ninety-degrees. Alternatively, the support tray can be coupled to the linear drive motor through a rigid coupling. An elastic element can be coupled between the support tray and a housing of the linear drive motor. In this configuration, the predetermined phase relationship is an absolute value of a difference in phase between the electrical signal and the drive signal of substantially zero-degrees.

The desired shaking frequency can be a resonant frequency of movable elements of the resonant shaker. Modifying the drive current can include adjusting a frequency of the drive current in response to the predetermined phase relationship between the electrical signal and the drive signal.

Modifying the drive current can include adjusting at least one of a frequency and an amplitude of the drive current based on a measure of viscosity of the specimen. Additionally, modifying the drive current can include adjusting at least one of a frequency and an amplitude of the drive current based on a measure of a PH value of the specimen. Modifying the drive current can include adjusting at least one of a frequency and an amplitude of the drive current based on a measure of temperature of the specimen.

In addition, modifying the drive current can include adjusting at least one of a frequency and an amplitude of the drive current based on a measure of turbulence of the specimen. Modifying the drive current can include adjusting at least one of a frequency and an amplitude of the drive current based on a measure of conductivity of the specimen. In addition, modifying the drive current can include adjusting at least one of a frequency and an amplitude of the drive current based on a measure of resistivity of the specimen. Modifying the drive current can include adjusting at least one of a frequency and an amplitude of the drive current based on a measure of chemical composition of the specimen.

In another aspect, the resonant shaker can include a support tray for supporting a target carrier. A linear drive motor includes an armature that is coupled to the support tray. The linear drive motor provides an oscillating drive force to the support tray in response to a drive current applied to the linear drive motor. A controller is electrically coupled to the linear drive motor. The controller receives a signal that is indicative of a measured parameter of the linear drive motor. The controller transmits a modified drive current to the linear drive motor in response to the signal.

The measured parameter can include an input impedance of the linear drive motor. The measured parameter can also include at least one of an input current, input power, or input voltage to the linear drive motor. The measured parameter can include at least one of a displacement, a velocity, an acceleration, and a jerk of the armature of the linear drive motor.

A sensor can be coupled to the support tray. The target carrier can contain a specimen that is chosen from the group comprising a chemical material, a biological material, a cell culture, a tissue, and a tissue construct. The target carrier can contain a specimen that is chosen from the group comprising a particulate substance, a slurry, and a fluid. In one embodiment, a frequency of oscillation of the support tray causes the combination at least two materials. In one embodiment, a frequency of oscillation of the support tray causes the separation of at least two materials.

The armature can be coupled to the support tray through an elastic element. Alternatively, the armature can be coupled to the support tray through a rigid coupler. In this configuration, an elastic element is coupled between the support tray and a housing of the linear drive motor. The controller can control at least one of a frequency and an amplitude of an oscillation of the armature of the linear drive motor.

DETAILED DESCRIPTION

Figure 1:
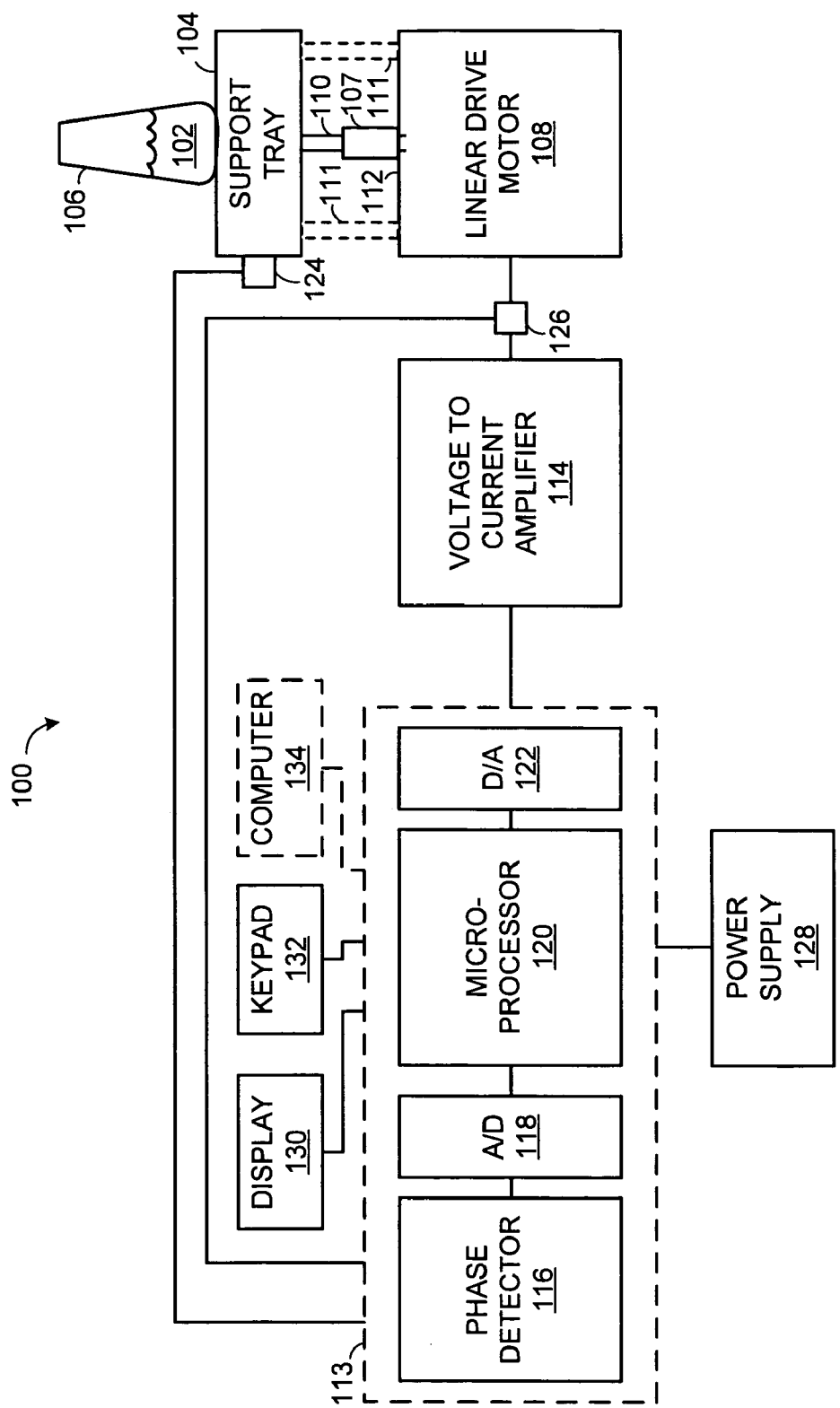
FIG. 1 illustrates a block diagram of a system for shaking a specimen according to the invention.

Processing chemical materials, biological materials, and other materials, such as screws, nails, nuts, and bolts, and/or particulates or fluids often requires the mixing or separating of materials within a container. An apparatus according to the invention can effectively shake a specimen at a desired frequency. The desired frequency can be the resonant frequency of the system including the container or target carrier containing the specimen to be mixed. The resonant frequency of the system can provide efficient mixing or separating of the specimen while minimizing the input energy required to maintain the mixing or separating. The apparatus is generally configured for use in a vertical dimension, but can also be configured for use in a horizontal dimension.

The apparatus can automatically adjust the amplitude and/or the frequency of the shaking mechanism as properties of the specimen change during the shaker (e.g., viscosity, mass, temperature, PH value, resistivity, conductivity, etc.). Additionally, to achieve significant leverage from the motor, the mechanical system can be designed as a resonant structure with a high Q value. This can make the system sensitive to small changes in the properties of the specimen and/or the mechanical system. The closed-loop control scheme can employ a feedback circuit. To automatically adjust the amplitude and/or the frequency of the shaking mechanism, the closed-loop control scheme is used to maintain the system driven near resonance despite changes in the target specimen or the mechanical system. For example, depending on the system configuration, the phase relationship between a signal that is related to a characteristic of the movable elements of the system (e.g., displacement, velocity, acceleration, and/or jerk) and a drive signal applied to the driving motor of the system can be used to determine a desired shaking frequency of the specimen (i.e., the resonant frequency of the system).

In other configurations, a linear drive motor provides an oscillating drive force to a support tray in response to a drive current applied to the linear drive motor. A controller is electrically coupled to the linear drive motor. The controller receives a signal that is indicative of the measured parameter of the linear drive motor. The signal can be generated by a load sensor, such as an ohm meter, for example. The controller transmits a modified drive current to the linear drive motor in response to the measured parameter. The modified drive current applied to the linear drive motor can drive the movable elements of the system near resonance despite changes in the target specimen or the mechanical system.

The measured parameter can include an input impedance of the linear drive motor, for example. In this embodiment, the behavior of the impedance load of the linear drive motor can be measured at the input terminals of the motor. The behavior of the impedance load can be related to the resonance of the moving elements of the system.

The measured parameter can also include at least one of an input current, input power, or input voltage to the linear drive motor. The measured parameter can include at least one of a displacement, a velocity, an acceleration, and a jerk of the armature of the linear drive motor.

The resonant shaker of the present invention can be used to cause the mixing or combination of two or more media (including liquids, gases, and solids) either as an intermediate material or as a final product.

Additionally, the resonant shaker can be used to separate materials in a resonant separation application. A resonant separation application includes applications intended to cause sifting, filtering, sorting, cleaning, dividing, and/or isolating of two or more media (including liquids, gases and solids) either as an intermediate material or as a final product. For example, the material or specimen can be a particulate substance, a slurry, or a fluid.

The resonant shaker can be used to promote cell culturing which can include the cultivation of cells in the laboratory. Cultures must provide sources of energy and raw material for biosynthesis, as well as a suitable physical environment. Cultures isolated from nature are usually mixed; pure cultures are best obtained by subculturing single colonies. Viruses are often grown in cultures of a host cell, and may be isolated as plaques in a continuous lawn of those cells.

In ordinary cultures the cells are at all possible stages in their division cycle and the composition of the medium changes continually as a result of their metabolism (until growth ceases, in the stationary phase of the culture). On transfer of a relatively minute number of cells (e.g., inoculum) to fresh medium, there may be a lag phase, without multiplication, followed by a phase of exponential growth. Synchronous cultures are achieved by blocking growth or harvesting cells at a specific stage; the cells then divide in synchrony for several generations. In continuous cultures, fresh medium flows into the vessel and full-grown culture flows at the same rate (such as in a chemostat); the cells are therefore harvested from a medium of constant composition. Laboratory cultures are often made in small flasks, test tubes, or covered flat dishes (petri dishes). Industrial cultures for antibiotics or other microbial products are usually in fermentors of 10,000 gallons (37,850 liters) or more. The resonant shaker can separate the cells from the culture fluid by centrifugation or filtration.

Specific procedures are employed for isolation, cultivation, and manipulation of microorganisms, including viruses and rickettsia, and for propagation of plant and animal cells and tissues. The inoculum is introduced into a sterilized nutrient environment, the medium. The culture medium in a suitable vessel or target carrier is protected by cotton plugs or loose-fitting covers with overlapping edges so as to allow diffusion of air and to also prevent access of contaminating organisms from the air or from unsterilized surfaces. The transfer, or inoculation, usually is done with the end of a flamed, then cooled, platinum wire. Sterile swabs may also be used and, in the case of liquid inoculum, sterile pipets.

The aqueous solution of nutrients may be left as a liquid medium or may be solidified by incorporation of a nutritionally inert substance, most commonly agar or silica gel. Special gas requirements may be provided in culture vessels closed to the atmosphere, as for anaerobic organisms. Inoculated vessels are held at a desired constant temperature in an incubator or water bath. The resonant shaker can mechanically agitate the liquid culture media during incubation. Maximal growth, which is visible as a turbidity or as masses of cells, is usually attained within a few days, although some organisms may require weeks to reach this stage.

Cell culturing may be used for the purpose of, for example, the production of useful products such as proteins, recombinant proteins, metabolites, secondary metabolites, monoclonal antibodies, and pharmaceuticals. Cell culturing may also be used to produce useful quantities of cells for medical or therapeutic applications.

Cell culturing can also include direct or indirect actuation of cells organized into tissues or tissue constructs. The term "direct actuation" means the application of stress, strain, flow, temperature or nutrient environment to cells or tissues within a bioreactor chamber. The term "indirect actuation" means the mechanical excitation of an entire chamber containing cells or tissues. Thus, the resonant shaker can be used to process chemical materials, biological materials, cell cultures, and/or tissues or tissue constructs through indirect actuation.

FIG. 1 illustrates a block diagram of a system 100 for shaking a specimen 102 according to the invention. The system 100 includes a support tray 104 that is configured to support a target carrier 106 containing the specimen 102. The support tray 104 is coupled to an armature 107 of a linear drive motor 108 through a coupler 110. The coupler 110 can rigidly couple the support tray 104 to the armature 107 of the linear drive motor 108. In this configuration, optional members 111 can be positioned between the support tray 104 and a housing 112 of the linear drive motor 108. The optional members 111 can be elastic elements, such as springs, for example.

Alternatively, the coupler 110 can couple the support tray 104 to the armature 107 of the linear drive motor 108 through an elastic element, such as a spring (not shown). In this configuration, optional members 111 can be positioned between the support tray 104 and the housing 112 of the linear drive motor 108. Here, the optional members 111 can be guide rods that guide and stabilize the support tray 104, for example. The optional members 111 can be slides, telescoping members, or any other mechanism that guides and stabilizes the support tray 104. The optional members 111 can also be elastic elements, such as springs. Various techniques for coupling the support tray 104 to the armature 107 of the linear drive motor 108 are described in more detail herein.

The specifications and requirements of the linear drive motor 108 can change depending on the coupling between the armature 107 of a linear drive motor 108 and the support tray 104. For example, when the coupling between the armature 107 of a linear drive motor 108 and the support tray 104 is through an elastic element, the linear drive motor 108 should exhibit relatively high force coupled with relatively low displacement. Conversely, when the coupling between the armature 107 of a linear drive motor 108 and the support tray 104 is through a rigid coupler, the linear drive motor 108 should exhibit relatively low force coupled with relatively high displacement.

A controller 113 is electrically coupled to an amplifier 114. The amplifier 114 is electrically connected to the linear drive motor 108. The amplifier 114 receives a drive control signal from the controller 113 and provides a drive current to the linear drive motor 108. In addition to providing a drive control signal, the controller 113 can also provide signal conditioning and phase detection, which is described in more detail herein.

The controller 113 can include a phase detector 116, an analog-to-digital (A/D) converter 118, a microprocessor 120, and a digital-to-analog (D/A) converter 122. The components 116, 118, 120, and 122 can be configured in a different manner. Additionally, the controller 113 can include various other components. Alternatively, the controller can encompass different components than shown.

A sensor 124 is rigidly attached to the support tray 104. The sensor 124 can be a position sensor, a velocity sensor, an accelerometer, or a jerk sensor, for example. The sensor 124 is electrically coupled to the controller 113. The sensor 124 provides an electrical signal to the controller 113. The electrical signal can be related to the displacement, velocity, acceleration and/or jerk of the support tray 104. The sensor 124 can include any sensor that provides position, velocity, acceleration, or jerk information relating to the support tray.

For example, the sensor 124 can include an electrical sensor, an electromechanical sensor, an electro-fluidic sensor, or an optical sensor.

In one configuration, the sensor 124 is an accelerometer that generates an acceleration signal. The acceleration signal can be used to generate other information (besides acceleration) about the support tray 104. For example, the integration of an acceleration signal results in a velocity signal and the integration of a velocity signal results in a displacement signal. Thus, when the sensor 124 is an accelerometer, the controller 113 can use acceleration, velocity or displacement of the support tray 104 as a measurement parameter. However, when processing a waveform, it is generally desirable to include high-frequency information. When integrating a signal from acceleration to velocity, the high-frequency response is generally reduced in level due to approximations in the integration (i.e., through the use of a low-pass filter). Thus, many small irregularities in the waveform can disappear.

Additionally, the sensor 124 can be any type of accelerometer. For example, the accelerometer can be a seismic instrument, such as a translational accelerometer which measures acceleration without regard to a reference point. In general, the type of sensing device used to measure the acceleration determines whether the accelerometer is considered a mechanical or electromechanical device. One type of mechanical accelerometer includes a liquid-damped cantilever spring-mass system. In an electromechanical device, the type of electromechanical sensing device classifies the accelerometer as a variable resistance, variable inductance, piezoelectric, piezotransistor, or servo type of instrument or transducer.

A current sensor 126 is coupled between the amplifier 114 and the linear drive motor 108. The current sensor 126 measures the drive current supplied to the linear drive motor 108 by the amplifier 114. The current sensor 126 is electrically coupled to the controller 113 and provides a drive signal to the controller 113. In one embodiment, a voltage sensor (not shown) is used to measure the voltage supplied to the linear drive motor 108. The voltage sensor could be electrically coupled to the controller 113 and could provide a voltage signal to the controller 113.

A power supply 128 is electrically coupled to the controller 113. The power supply 128 can be an alternating current (AC) power supply, a direct current (DC) power supply or a radio-frequency (RF) power supply. The power supply 128 is configured to supply power to the controller 113.

The system 100 can also include a display 130 that is coupled to the controller 113. The display 130 can be used to display data relating to properties of the specimen 102 as well as data relating to properties of the system 100, such as the frequency and amplitude of the shaking process. A keypad 132 can also be coupled to the controller 113. The keypad 132 can be used to input control parameters into the controller 113 to control the system 100. For example, the control parameters can include on/off, time, frequency, and/or amplitude of the shaking process.

The system 100 can also include a computer 134 that is coupled to the controller 113. The computer 134 can control the system 100 from a remote location, for example. Additionally, the computer 134 can collect and store data relating to the process, such as data from the sensor 124, data from the current sensor 126, and/or data from sensors (not shown) that monitor the specimen 102, for example.

The system 100 can be connected to the computer 134 via a network, such as a local area network (LAN) (not shown).

In this configuration, the computer 134 can be used to control and collect data from several systems 100 to facilitate batch processing for example.

The system 100 processes the specimen 102 using the following general operating principles. The specific operating principles of the system 100 generally depend on the specific system configuration and are described in more detail herein. The target carrier 106 containing the specimen 102 is loaded onto the support tray 104. The system 100 is activated through functions on the keypad 132 or the computer 134. Once the system 100 is activated, the linear drive motor 108 begins oscillating the support tray 104 at a predetermined frequency.

The sensor 124 measures a specific parameter of the moving support tray 104. For example, in one configuration, the sensor 124 is an accelerometer that measures an acceleration of the support tray 104. The sensor 124 transmits an electrical signal that is related to the acceleration of the support tray 104 to the phase detector 116. The phase detector 116 is shown integrated with the controller 113, but can alternatively embody a separate component.

The current sensor 126 measures the drive current supplied to the linear drive motor 108 by the amplifier 114. A drive signal from the current sensor 126 representative of the drive current is transmitted to the phase detector 116.

The phase detector 116 can measure the phase between two independent input signals. For example, the phase detector 116 can measure the absolute value of a difference in phase between the electrical signal and the drive signal. The resonant frequency of the system is related to the phase relationship between the electrical signal and the drive signal. In one configuration, the resonant frequency of the system is reached when the absolute value of the difference in phase between the electrical signal (i.e., the signal from the accelerometer) and the drive signal (i.e., the measured drive current that drives the linear drive motor 108) is maintained at ninety-degrees. This phase relationship assumes that the armature 107 of the linear drive motor 108 is coupled to the support tray 104 through an elastic element, such as a spring, for example.

In one embodiment, the sensor 124 is a velocity sensor. In this embodiment, the sensor 124 transmits an electrical signal to the phase detector 116 that is related to the velocity of the support tray 104. The resonant frequency of the system is reached when the absolute value of the difference in phase between the electrical signal (i.e., the signal from the velocity sensor) and the drive signal (i.e., the measured drive current that drives the linear drive motor 108) is maintained at zero-degrees or 180-degrees. This phase relationship assumes that the armature 107 of the linear drive motor 108 is coupled to the support tray 104 through an elastic element, such as a spring, for example.

In another embodiment, the sensor 124 is a displacement sensor that transmits an electrical signal to the phase detector 116 that is related to the displacement of the support tray 104. The resonant frequency of the system is reached when the absolute value of the difference in phase between the electrical signal (i.e., the signal from the position sensor) and the drive signal (i.e., the measured drive current that drives the linear drive motor 108) is maintained at ninety-degrees. This phase relationship assumes that the armature 107 of the linear drive motor 108 is coupled to the support tray 104 through an elastic element, such as a spring, for example.

The phase detector 116 transmits an analog signal to the A/D converter 118 that is related to the phase relationship between the electrical signal and the drive signal. The A/D converter 118 converts the analog signal to a digital signal and transmits the digital signal to the microprocessor 120. The microprocessor 120 generates a modified drive control signal having a different frequency and/or amplitude than the instant drive control signal to modify the phase relationship between the electrical signal and the drive signal. The modified drive control signal is converted to an analog signal by the D/A converter 122. The modified drive control signal is transmitted by the controller 113 to the amplifier 114. The amplifier 114 converts the modified drive control signal to a drive current that is suitable for driving the linear drive motor 108.

In general, for a shaker having multiple masses and multiple spring elements, the phase relationship between the drive signal and the acceleration signal can be complex. The techniques taught herein can be used in such complex systems. In many of these complex systems, the signals can have approximately a monotonic phase relationship over a desired frequency range of the drive signal.

In one embodiment, the system 100 uses a "hunting" algorithm to determine and maintain the appropriate frequency that drives the linear drive motor 108 in order to shake the specimen at the resonant frequency of the moving elements of the system 100. The hunting algorithm is described in more detail herein. It should be noted that there are various other techniques that can be used to determine and maintain the drive frequency, such as by measuring and monitoring the displacement of the armature 107 and/or the support tray 104 and transmitting the displacement measurement to the controller 112. Other techniques can involve monitoring the drive current supplied to the linear drive motor using a feedback mechanism and/or monitoring another parameter of the system and supplying the monitored information to the controller 112.

Figure 2:
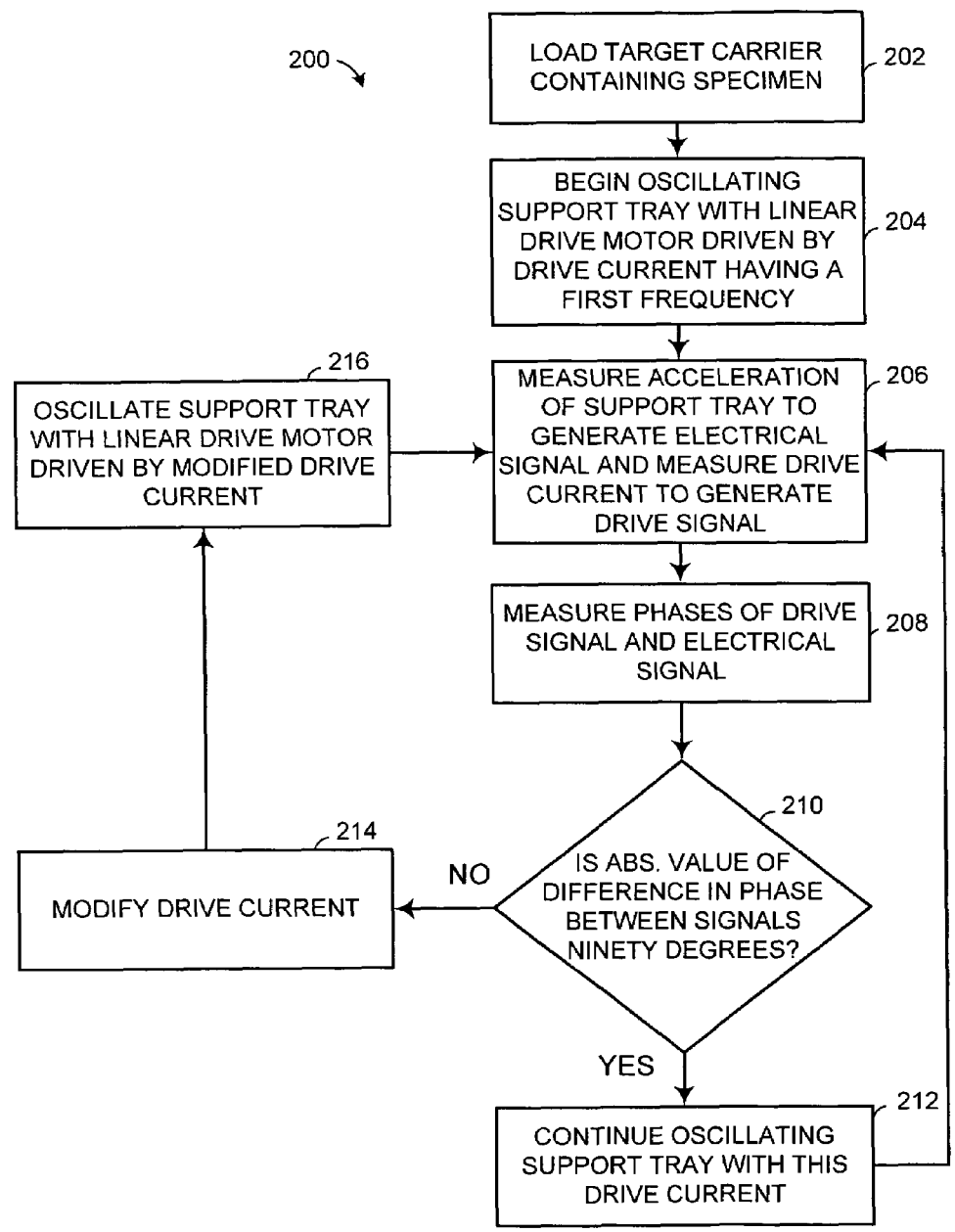
FIG. 2 illustrates a flowchart of a process of shaking a specimen according to the invention.

FIG. 2 illustrates a flowchart 200 of a process of shaking a specimen 102 (FIG. 1) according to the invention. In a first step 202, the target carrier 106 (FIG. 1) containing the specimen 102 is initially loaded onto the support tray 104 (FIG. 1). In a second step 204, the controller 113 transmits a drive current having a first frequency to the linear drive motor 108 to oscillate the support tray 104 at the first frequency. The first frequency is a low frequency that is below the target resonant frequency of the system.

In a third step 206, the sensor 124 measures the acceleration of the support tray 104 and generates an electrical signal. The controller 113 receives the electrical signal that corresponds to the measured acceleration of the support tray 104. Additionally, the current sensor 126 measures the drive current and generates a drive signal. The controller 113 receives the drive signal that corresponds to the measured drive current. The measurement of the acceleration of the support tray 104 and the measurement of the drive current can occur simultaneously or in any order, providing that the phase relationship between the electrical signal and the drive signal is significantly preserved.

In a fourth step 208, the phase detector 116 which, in this example, is integrated with the controller 113, measures the phases of the drive signal and the electrical signal. The phase detector 116 then waits for the phase measurement to stabilize. For example, the wait time is generally proportional to the Q of the system. Thus, for a high Q system, the wait time for the phase measurement to stabilize is generally longer than a wait time for a system having a lower Q.

In a fifth step 210, the controller 113 compares the absolute value of the difference in phase between the drive signal and the electrical signal. If the absolute value of the difference in phase between the drive signal and the electrical signal equals ninety-degrees (the value of the difference in phase depends on the system configuration), the mixing process proceeds using the instant drive current according to a sixth step 212. The instant drive current applied to the linear motor causes the movable elements of the system to oscillate at the resonant frequency. The controller 113 continues to monitor the acceleration of the support tray 104 and the drive current supplied to the linear drive motor 108 according to step 206 in the event that system disturbances and/or drifts drive the system out of resonance.

If the absolute value of the difference in phase between the drive signal and the electrical signal does not equal ninety-degrees (for this system configuration), the drive current is modified according to a seventh step 214. The controller 113 modifies the drive current according to a "best-guess" hunting algorithm that is discussed in more detail herein.

In one embodiment, the algorithm determines whether the phase is above or below ninety-degrees. The absolute value of the difference is used when the system is configured to use a phase difference of zero-degrees or 180-degrees. Thus, at the fifth step 210 the controller 113 checks to see if the difference in phase is above or below ninety-degrees. If the difference in phase is above ninety-degrees, then the controller 113 decreases the frequency of the drive current. If the difference in phase is below ninety-degrees, then the controller 113 increases the frequency of the drive current.

The controller 113 applies the modified drive current to the linear drive motor 108 which oscillates the support tray according to an eighth step 216. The modified frequency of the oscillation changes the measurement of the acceleration from the sensor 124. In step 206, the phase detector 116 measures the phases of the modified drive signal and the electrical signal corresponding to the new value of the acceleration of the support tray 104.

This loop continues until a predetermined phase relationship between the electrical signal from the sensor 124 (e.g., the accelerometer) and the drive signal from the current sensor 126 is achieved. In one embodiment, the predetermined phase relationship corresponds to the resonant frequency of the moving elements of the system 100. The system can be driven off resonance by allowing the user to set the desired phase set-point to a value other than the value corresponding to the predetermined phase relationship.

Figure 3:
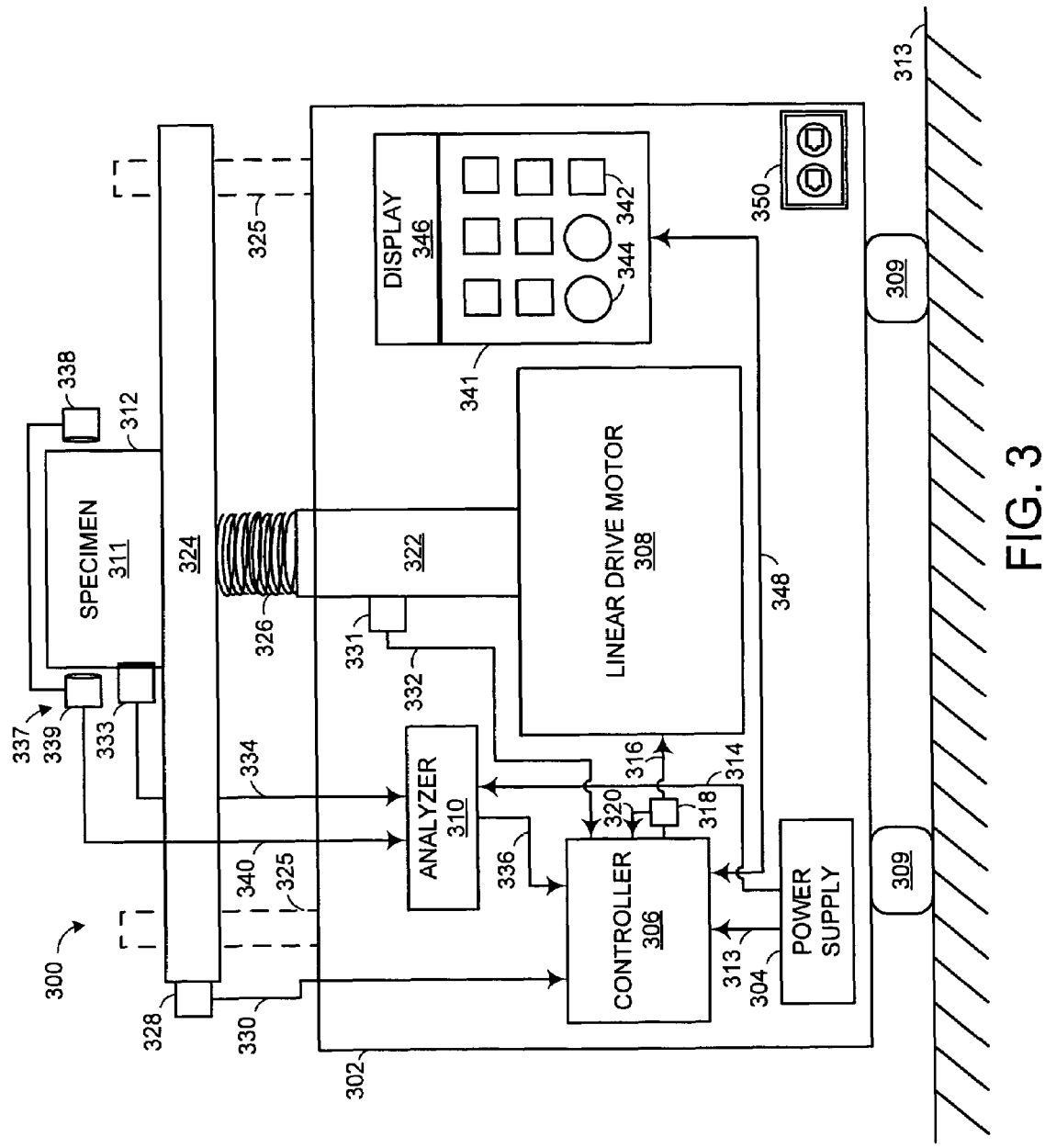
FIG. 3 illustrates a block diagram of a resonant shaker according to the invention.

FIG. 3 illustrates a block diagram of a resonant shaker 300 according to the invention. The resonant shaker 300 includes an enclosure 302 that houses a power supply 304, a controller 306 and a linear drive motor 308. The enclosure 302 can also include feet 309. The feet 309 can be composed of an elastic material, such as rubber, to dampen vibrations from the resonant shaker 300 and to prevent the resonant shaker 300 from moving in a lateral direction during operation. Other suitable materials can also be used to reduce vibration and/or prevent the resonant shaker 300 from moving during operation. The resonant shaker 300 can also include an optional analyzer 310 that can analyze certain properties of a specimen 311 contained within a target carrier 312. The resonant shaker 300 is generally placed on a solid surface 313 such as a table, a pedestal, a floor, or a shelf.

The power supply 304 is configured to supply power to the controller 306, the analyzer 310, and any other necessary and/or optional components. For example, the power supply 304 supplies power to the controller 306 through a power transmission line 313. Similarly, the power supply 304 supplies power to the analyzer 310 through a power transmission line 314.

The controller 306 couples power to the linear drive motor 308 through a power transmission line 316. A current sensor 318 is coupled to the power transmission line 316. The current sensor 318 measures the drive current supplied to the linear drive motor 308 and generates a drive signal. The current sensor 318 communicates the drive signal to the controller 306 through a signal transmission line 320.

The linear drive motor 308 includes an armature 322 that is coupled to a support tray 324 through an elastic element 326, such as a spring. The elastic element 326 can include, but is not limited to, a coil spring, a leaf spring, a torsional spring, a disk spring, an elliptic spring, a helical spring, an air spring, a cantilever spring, a rubber element, such as a grommet, or any element that stores energy as a function of displacement and when released, eventually recovers its basic form and position. Additionally, one or more optional guide rods 325 can be used to guide and stabilize the support tray 324. In this configuration, the support tray 324 can include bearings (not shown) that ride on the guide rods 325.

Although the system 300 is shown having an elastic element 326 including a single coil spring that couples the armature 322 to the support tray 324, the system can include multiple elastic elements and multiple masses configured in various forms. In these configurations, the armature 322 is elastically coupled to the support tray 324 as opposed to being rigidly attached to the support tray 324. Configurations in which an armature is rigidly attached to the support tray 324 are described herein.

The linear drive motor 308 can embody a moving coil or a moving magnet-type linear motor. The linear drive motor 308 can also include additional elements, such as a coil (not shown) and a permanent magnet (not shown). The linear drive motor 308 can also include a mechanism (not shown) for maintaining the armature 322 at a predetermined position within the core before current is applied to the coil of the linear drive motor 308. For example, the mechanism can include a spring (not shown) that supports the mass of the support tray 324, the target carrier 312, the specimen 311, and any other moving elements, so that the linear drive motor 308 is not required to expend energy supporting a static load.

In one embodiment, the linear drive motor 308 can embody a moving magnet-type linear motor of the type described in U.S. Pat. No. 5,216,723, entitled "Permanent Magnet Transducing." The entire disclosure of U.S. Pat. No. 5,216,723 is incorporated herein by reference.

As previously described, a sensor 328 is rigidly coupled to the support tray 324. The sensor 328 can be a position sensor, a velocity sensor, an accelerometer, or a jerk sensor. The sensor 328 measures a parameter of the support tray 324 and generates an electrical signal. The sensor 328 communicates the electrical signal to the controller 306 through a signal transmission line 330.

An optional sensor (not shown) can be coupled between input terminals (not shown) of the linear drive motor 308. The optional sensor can be a load sensor that measures an impedance load of the linear drive motor 308. The optional sensor can be configured to send a signal indicative of the impedance load to the controller 306. The value of the impedance load can be related to the resonant frequency of the moving elements of the system 300. Other sensors for measuring electrical properties of the linear drive motor 308 can also be used.

An optional sensor 331 can be rigidly attached to the armature 322. The sensor 331 can be a position sensor, a velocity sensor, an accelerometer, or a jerk sensor. The sensor 331 measures a parameter of the armature 322 and generates an electrical armature signal. The sensor 331 communicates the electrical armature signal to the controller 306 through a signal transmission line 332. The controller 306 can use the electrical armature signal to determine characteristics of the system 300. For example, the electrical armature signal can be compared with the drive signal from the current sensor 318 to determine performance characteristics of the linear drive motor 308. The electrical armature signal from the sensor 331 can also be used to determine the resonance of the system 300. For example, the resonant frequency of the system 300 corresponds to a frequency at which the armature 322 has a minimum displacement.

The resonant shaker 300 can optionally include a probe 333 that can measure a property of the specimen 311. For example, the property can include viscosity, mass, temperature, PH value, resistivity, conductivity, etc. The probe 333 can be positioned so as to be in contact with the specimen 311. In one embodiment, the probe 333 can be a device that is designed to measure the turbulence of a fluid, such as a pressure sensor. Alternatively, the probe 333 can be a device that is designed to measure the temperature of the specimen 311, such as a thermocouple. Examples of probes for measuring the properties of specimens are described in U.S. Pat. No. 5,033,321, entitled "Method and Apparatus for Measuring the Degree of Mixing in a Turbulent Liquid System," the entire disclosure of which is incorporated herein by reference.

The probe 333 communicates a probe signal to the analyzer 310 through a signal transmission line 334. The analyzer 310 analyzes the probe signal and generates an analyzer signal that is transmitted to the controller 306 though a signal transmission line 336. The controller 306 processes the analyzer signal and determines whether or not to continue processing or to adjust the frequency and/or amplitude of the processing.

The resonant shaker 300 can also optionally include an optical instrument 337, such as a spectrophotometer, a polarimeter, or an ellipsometer, for example, that can measure a property of the specimen 311 insitu. The optical instrument 337 can include an emitter section 338 and a detector section 339. The optical instrument 337 is coupled to the analyzer 310 through a signal transmission line 340. Alternatively, the optical instrument 337 is coupled to a different analyzer (not shown), a processor (not shown), or to the controller 306.

The resonant shaker 300 can also include a keypad 341 that can be mounted to the enclosure 302. The keypad 341 can include control buttons 342 and/or rotary control knobs 344. The resonant shaker 300 can also include a display 346, such as a liquid crystal display (LCD) or a light emitting diode (LED) display. The display 346 can display system parameters, such as the shaking frequency, elapsed time, information from the optical instrument 337, or other parameters from the sensors 328, 331, and 333, for example. The keypad 341 and/or the display 346 can be connected to the controller 306 through a bi-directional signal line 348. Alternatively, the keypad 341 and the display 346 can each be connected to the controller 306 using two individual signal transmission lines (not shown).

The resonant shaker 300 can also include one or more input/output ports 350 for connecting the resonant shaker 300 to a computer network, to another resonant shaker, or to external equipment (not shown). For example, multiple resonant shakers 300 can be networked together and controlled by an external computer (not shown) in order to facilitate batch processing.

Figure 4:
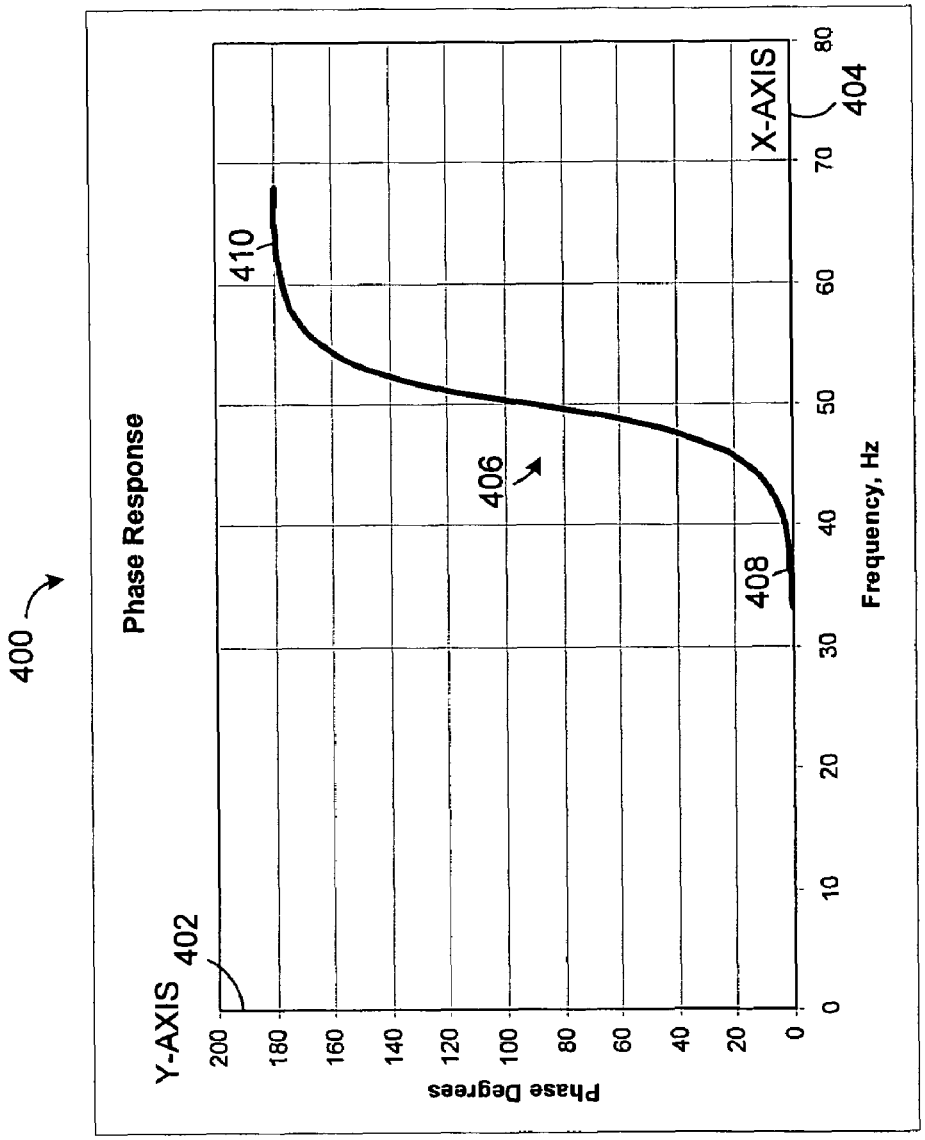
FIG. 4 is a graphical representation of phase response as a function of frequency for the resonant shaker of FIG. 3.

The operation of the resonant shaker 300 is described with reference to FIG. 4. FIG. 4 is a graphical representation 400 of phase response as a function of frequency for the resonant shaker of FIG. 3. The Y-axis 402 of FIG. 4 represents the absolute value of the difference in phase between the electrical signal from the sensor 328 (FIG. 3) and the drive signal from the current sensor 318 (FIG. 3). The X-axis 404 represents the frequency of oscillation of the movable elements of the resonant shaker 300 including the specimen 311.

The frequency of the oscillation can be the resonant frequency of the system 300. For example, the resonant frequency provides thorough mixing of the specimen 311 while minimizing the energy required to maintain the mixing. This assumes that the linear drive motor 308 is not required to support the static mass of the moving elements of the system 300 (e.g., the linear drive motor can include suitably stiff armature centering springs). Thus, it can be desirable to mix the specimen 311 at the resonant frequency.

As previously described, the resonant frequency of the system 300 is achieved by maintaining a predetermined phase relationship between the drive signal and the electrical signal from the sensor 328 (FIG. 3). If the sensor 328 is an accelerometer, the predetermined phase relationship is ninety-degrees. If the sensor 328 is a velocity sensor, the predetermined phase relationship is zero-degrees. If the sensor 328 is a position sensor, the predetermined phase relationship is ninety-degrees.

In another example, the frequency of the oscillation can be off resonance. In this example, the control algorithm drives the system below the resonant frequency. The control algorithm can also drive the system above the resonant frequency. In one embodiment, the control algorithm can use this information to determine that the resonant frequency does indeed exist.

Additionally, the controller 306 can also adjust the amplitude of the oscillation during the processing of the specimen 311 by supplying an appropriate amplitude of drive current to the linear drive motor 308. The linear drive motor 308 can drive the support tray 324 to various different vertical displacements during the operation of the resonant shaker 300. The amplitude of the vertical displacement depends on the specimen 311 and the desired mixing parameters. The maximum amplitude adjustment is related to the maximum excursion of the armature 322 of the linear drive motor 308.

As shown in FIG. 4, the phase response has a substantially monotonic behavior over an illustrative frequency range of interest. The desired ninety-degree phase value is located in the substantially linear range between approximately 45 Hz and approximately 55 Hz. The resonant frequency can change as mass is added to the system. For example, if the system 300 is operated without a target carrier containing a specimen 311, the resonant frequency can be approximately 60 Hz. When a target carrier containing a typical specimen 311 is added to the support tray 324, the resonant frequency can decrease to 50 Hz, for example. The resonant frequency decreases further as additional mass is added to the support tray 324.

Thus, when the frequency of the drive control signal is constrained to only operate in the vicinity of the desired resonant frequency, substantially above lower parasitic system resonances but substantially below higher parasitic resonances, the phase relationship follows the substantially monotonic curve 406 shown in FIG. 4.

Toward the low frequency end 408 of the curve 406 (35 Hz in this example), the slope of the curve 406 is approximately zero. As the frequency increases, the slope of the curve 406 transitions such that the slope reaches a maximum value. The sharpness of this transition is directly related to the Q of the mechanical system. The curve 406 is substantially linear between approximately 45 Hz and approximately 55 Hz. At the higher frequency range 410, the slope of the curve 406 transitions to approximately zero.

The controller 306 (FIG. 3) attempts to adjust the frequency of the drive control signal to operate on the center of the curve 406 in the linear region where the phase of the relationship between the acceleration signal and the drive signal is ninety-degrees. As previously described, the frequency depends on the mass of the moving elements of the system 300. Since the response is non-linear, the controller 306 implements a hunting algorithm to locate the desired operating point at the center of the curve 406. The details of the hunting algorithm are described in detail herein. Other techniques and algorithms that are not described can also be used to locate the desired operating point at the center of the curve 406. Although a monotonic phase relationship is illustrated, other types of phase curves, linear or non-linear, can also be used. Additionally, the phase relationship can also be different than ninety-degrees.

The controller 306 (FIG. 3) determines the frequency of the drive control signal as follows. The controller 306 first drives the system at the lower frequency bound (35 Hz) and then waits long enough for the phase measurement to stabilize (this wait time is proportional to the Q of the system). The controller 306 then determines whether the phase measurement is below the desired operating point of ninety-degrees. Alternatively, the set point can be different than ninety-degrees. If the controller 306 determines that the phase measurement is not below the desired set point (ninety-degrees), the controller 306 can generate a fault condition, such as the specimen 311 is too heavy for the system 300.

If the controller 306 determines that the phase measurement is below the desired set point (ninety-degrees), the controller 306 changes the drive frequency to the upper frequency bound (65 Hz). The controller 306 again waits for the phase measurement to stabilize and determines whether the phase measurement is above the desired set point of ninety-degrees. If the controller 306 determines that the phase measurement is not above the desired set point (ninety-degrees), the controller 306 can generate a fault condition, such as a sensor fault.

If the controller 306 determines that the phase measurement is above the desired set point (ninety-degrees), the controller 306 determines that the desired set point is bracketed. The controller 306 then estimates the next frequency by choosing midpoint of the upper and the lower frequencies last used. The controller 306 then determines whether this next frequency is above or below the desired phase set point, and then chooses another frequency by bisecting the most recent frequency bracket. Once the controller 306 creates a frequency bracket (around the desired set point) that has a width that is less than or equal to a predetermined threshold that is related to the resolution of the controller 306, it modifies the hunting strategy. In one embodiment, the controller 306 enters a variable stepping mode scheme.

The variable stepping mode adjusts the frequency in the direction of the desired phase using a step size that is determined by the magnitude of the phase error. In one embodiment, the phase error is calculated as the difference in the output of the phase detector in the controller 306 and ninety-degrees. The sign of the phase error determines the direction of the correction. As the control scheme gets closer to the desired set point, the step size is reduced and the control scheme dithers around the desired set point. If the system is disturbed, the controller 306 adjusts the step size and effectively re-hunts for the set point. Since the controller can be a digital controller having a finite step size, the exact resonance match may not be achieved. However, the system can be driven into resonance by dithering around the set point. The controller 306 can also adjust the amplitude of the resonance by supplying an appropriate amplitude of the drive current to the linear drive motor 308. The appropriate amplitude of drive current can reduce or intensify the displacement of the resonant oscillation.

Figure 5:
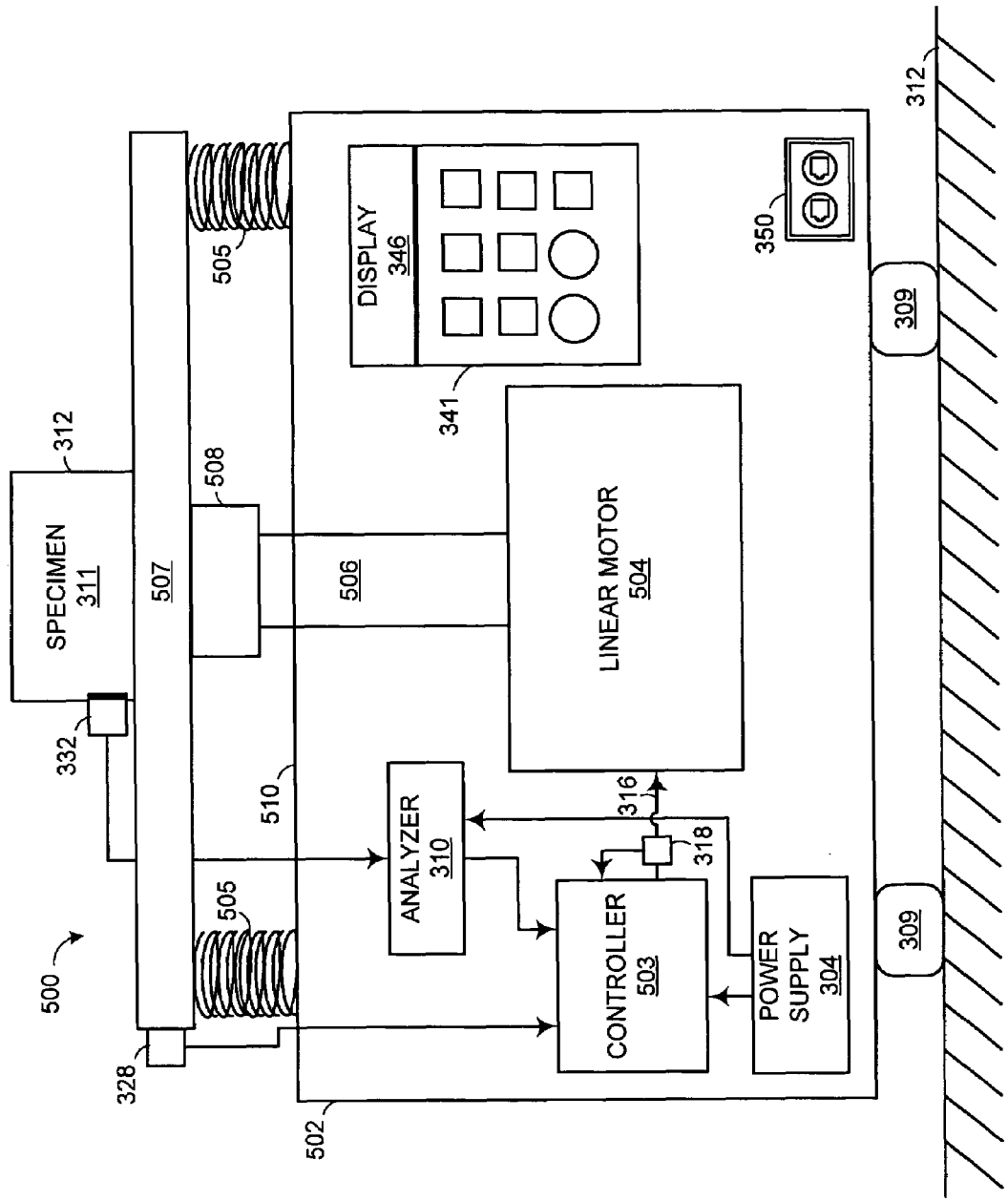
FIG. 5 illustrates a block diagram of another resonant shaker according to the invention.

FIG. 5 illustrates a block diagram of another resonant shaker 500 according to the invention. The resonant shaker 500 is similar to the resonant shaker 300 of FIG. 3 and includes an enclosure 502 that houses the power supply 304, a controller 503 and a linear drive motor 504. The linear drive motor 504 can have different characteristics than the linear drive motor 308 of FIG. 3. For example, the linear drive motor 504 can require less output power than the linear drive motor 308 and can have larger displacement requirements. Additionally, the linear drive motor 504 does not require centering springs since the static mass of the moving elements is supported by elastic elements 505 and not by the linear drive motor 504 in this embodiment.

The enclosure 502 can also include the feet 309. The feet 309 can be composed of an elastic material, such as rubber, to dampen vibrations from the resonant shaker 500 and to prevent the resonant shaker 500 from moving in a lateral direction during operation. Other suitable materials can also be used to reduce vibration and/or prevent the resonant shaker 500 from moving during operation. The resonant shaker 500 can also include the optional analyzer 310 that can analyze certain properties of a specimen 311. The resonant shaker 500 is generally placed on a solid surface 312 such as a table, a pedestal, a floor, or a shelf. The power supply 304 is configured to supply power to the controller 503, the analyzer 310, and any other necessary and/or optional components.

The controller 503 couples power to the linear drive motor 504 through the power transmission line 316. The current sensor 318 is coupled to the power transmission line 316 and measures the drive current supplied to the linear drive motor 504. The current sensor 318 communicates a drive signal to the controller 503.

The linear drive motor 504 includes an armature 506 that is coupled to a support tray 507 through a rigid coupling 508. The support tray 507 is coupled to a frame 510 of the enclosure 502 through one or more of the elastic elements 505. Alternatively, the elastic elements 505 can couple the support tray 507 to the base of the resonant shaker 500 or the solid surface 312. Any configuration that locates the one or more elastic elements 505 in a parallel arrangement with the armature 506 can be used. For example, the system can include multiple elastic elements, such as springs between the support tray 507 and the frame 510.

The elastic element 505 can include, but is not limited to, a coil spring, a leaf spring, a torsional spring, a disk spring, an elliptic spring, a helical spring, an air spring, a cantilever spring, a rubber element, such as a grommet, or any element that stores energy as a function of displacement and when released, eventually recovers its basic form and position.

The linear drive motor 504 can embody a moving coil or a moving magnet-type linear motor. The linear drive motor 504 can also include additional elements, such as a coil (not shown) and a permanent magnet (not shown).

As previously described, a sensor 328 is rigidly coupled to the support tray 507. The sensor 328 can be a position sensor, a velocity sensor, an accelerometer, or a jerk sensor. The sensor 328 measures a parameter of the support tray 507 and generates an electrical signal that is transmitted to the controller 503.

The resonant shaker 500 can optionally include the probe 332 that can measure a property of the specimen 311. For example, the property can include viscosity, mass, temperature, PH value, resistivity, conductivity, etc. The probe 332 can be positioned so as to be in contact with the specimen 311.

The probe 332 communicates a probe signal to the analyzer 310. The analyzer 310 analyzes the probe signal and generates an analyzer signal that is transmitted to the controller 503. The controller 503 processes the analyzer signal and determines whether or not to continue processing or to adjust the frequency and/or amplitude of the shaking.

The resonant shaker 500 can also include a keypad 341 that can be mounted to the enclosure 502. The resonant shaker 500 can also include a display 346, such as a liquid crystal display (LCD) or a light emitting diode (LED) display. The display 346 can display system parameters, such as the shaking frequency, elapsed time, or other parameters from the sensor 332, for example. The keypad 341 and/or the display 346 can be connected to the controller 503 as previously described.

The resonant shaker 500 can also include one or more input/output ports 350 for connecting the resonant shaker 500 to a computer network, to another resonant shaker, or to external equipment (not shown). For example, multiple resonant shakers 500 can be networked together and controlled by an external computer (not shown) in order to facilitate batch processing.

Figure 6:
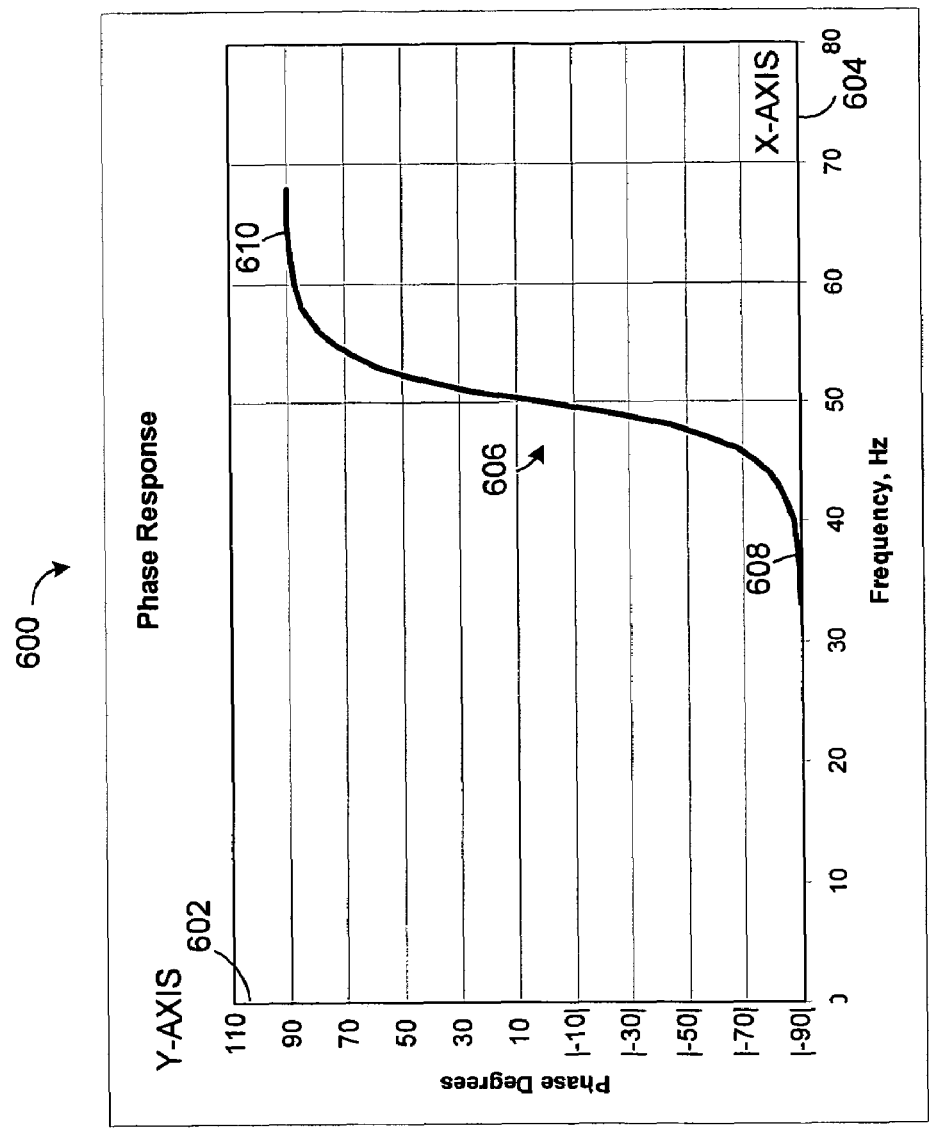
FIG. 6 is a graphical representation of phase response as a function of frequency for the resonant shaker of FIG. 5.

The operation of the resonant shaker 500 is described with reference to FIG. 6. FIG. 6 is a graphical representation 600 of phase response as a function of frequency for the resonant shaker 500 of FIG. 5.

The Y-axis 602 of FIG. 6 represents the absolute value of the difference in phase between the electrical signal from the sensor 328 (FIG. 5) and the drive signal from the current sensor 318 (FIG. 5). The X-axis 604 represents the frequency of oscillation of the movable elements of the resonant shaker 500 including the specimen 311.

The frequency of the oscillation can be the resonant frequency of the system 500. The resonant frequency provides efficient shaking of the specimen 311 while minimizing the energy required to maintain the shaking. Thus, it can be desirable to shake the specimen 311 at the resonant frequency.

As previously described, the resonant frequency of the system 500 is achieved by maintaining a predetermined phase relationship between the drive signal from the current sensor 318 and the electrical signal from the sensor 328 (FIG. 5). If the sensor 328 is an accelerometer, the predetermined phase relationship is zero-degrees or 180-degrees for the resonant shaker 500 of FIG. 5. Thus, the phase relationship is different for the system 500 of FIG. 5 as compared to the system 300 of FIG. 3. This is due to the differences in the configurations of the resonant shaker 300 and the resonant shaker 500. Referring back to FIG. 5, if the sensor 328 is a velocity sensor, the predetermined phase relationship is ninety-degrees. If the sensor 328 is a position sensor, the predetermined phase relationship is zero or 180-degrees.

As previously described, the controller 503 can also adjust the amplitude of the oscillation during the processing of the specimen 311. The linear drive motor 504 can displace the support tray 324 to various different vertical positions depending on the specimen and the desired mixing parameters. The maximum amplitude adjustment is related to the maximum excursion of the armature 505 of the linear drive motor 504 and the amplitude of the drive current.

As shown in FIG. 6, the phase response has a substantially monotonic behavior over an illustrative frequency range of interest. The desired zero or 180-degree phase value is located in the substantially linear range between approximately 45 Hz and approximately 55 Hz.

Thus, when the frequency of the drive control signal is constrained to only operate in the vicinity of the desired resonant frequency, substantially above lower parasitic system resonances but substantially below higher parasitic resonances, the phase relationship follows the substantially monotonic curve 606 shown in FIG. 6.

Toward the low frequency end 608 of the curve 606 (35 Hz in this example), the slope of the curve 606 is approximately zero. As the frequency increases, the slope of the curve 606 transitions to such that the slope reaches a maximum. The sharpness of this transition is directly related to the Q of the mechanical system. The curve 606 remains substantially linear between approximately 45 Hz and approximately 55 Hz. At the higher frequency range 610, the slope of the curve 606 transitions to approximately zero.

The controller 503 (FIG. 5) adjusts the frequency of the drive control signal to operate on the center of the curve 606 in the linear region where the phase of the relationship between the acceleration signal and the drive signal is zero-degrees. As previously described, the frequency depends on the mass of the moving elements of the system. Since the response is non-linear, the controller 503 implements a hunting algorithm to locate the desired operating point at the center of the curve 606. The details of the hunting algorithm are described in detail with reference to FIG. 4. Other techniques and algorithms that are not described can also be used to locate the desired operating point at the center of the curve 606. Although a monotonic phase relationship is illustrated, other types of phase curves, linear or non-linear, can also be used. Additionally, the phase relationship can also be different than zero-degrees.

While the invention has been particularly shown and described with reference to specific preferred embodiments, it should be understood by those skilled in the art that various changes in form and detail may be made therein without departing from the spirit and scope of the invention as defined herein. For example, although the systems and techniques are described primarily in the context of shaking at resonant frequencies, the systems and techniques are also applicable to shaking at other desired frequencies. In addition, although certain examples of control techniques and feedback mechanisms are described, the systems and techniques may be used in connection with other control techniques and feedback mechanisms. Accordingly, other embodiments are within the scope of the following claims.

What is claimed is:

1. A resonant shaker comprising:
a support tray for supporting a target carrier;
a sensor that generates an electrical signal that is related to an acceleration of the support tray;
a linear drive motor comprising an armature that is coupled to the support tray, the linear drive motor providing an oscillating drive force to the support tray in response to a drive current applied to the linear drive motor; and
a controller that receives both the electrical signal and a drive signal that is related to the drive current, the controller transmitting a modified drive current to the linear drive motor in response to a predetermined phase relationship between the electrical signal and the drive signal.

2. The resonant shaker of claim 1 wherein the sensor is coupled to one of the support tray, the armature, and the target carrier.

3. The resonant shaker of claim 1 wherein the linear drive motor provides a reciprocating motion to the support tray.

4. The resonant shaker of claim 1 wherein the predetermined phase relationship corresponds to a resonant frequency of movable elements of the resonant shaker.

5. The resonant shaker of claim 1 wherein the armature is coupled to the support tray through an elastic element and the predetermined phase relationship comprises an absolute value of a difference in phase between the electrical signal and the drive signal of substantially ninety-degrees.

6. The resonant shaker of claim 1 wherein the armature is coupled to the support tray through a rigid coupling and the predetermined phase relationship comprises an absolute value of a difference in phase between the electrical signal and the drive signal of substantially zero-degrees.

7. The resonant shaker of claim 1 wherein the target carrier comprises a bioreactor chamber.

8. The resonant shaker of claim 1 wherein the support tray is integrated with a bioreactor.

9. The resonant shaker of claim 1 wherein the target carrier is chosen from the group comprising a beaker, a test tube, and a multiple tube rack.

10. The resonant shaker of claim 1 wherein the target carrier contains a specimen that is chosen from the group comprising a chemical material, a biological material, a cell culture, a tissue, and a tissue construct.

11. The resonant shaker of claim 1 wherein the target carrier contains a specimen that is chosen from the group comprising a particulate substance, a slurry, and a fluid.

12. The resonant shaker of claim 1 wherein a frequency of oscillation of the support tray causes the combination at least two materials.

13. The resonant shaker of claim 1 wherein a frequency of oscillation of the support tray causes the separation of at least two materials.

14. The resonant shaker of claim 1 wherein the armature is coupled to the support tray through an elastic element.

15. The resonant shaker of claim 14 wherein the elastic element is chosen from the group comprising a grommet, a torsional spring, a coil spring, a leaf spring, a disc spring, an elliptical spring, a helical spring, an air spring, and a cantilever spring.

16. The resonant shaker of claim 1 wherein the armature is coupled to the support tray through a rigid coupler.

17. The resonant shaker of claim 16 further comprising an elastic element that is coupled between the support tray and a housing of the linear drive motor.

18. The resonant shaker of claim 17 wherein the elastic element is chosen from the group comprising a grommet, a torsional spring, a coil spring, a leaf spring, a disc spring, an elliptical spring, a helical spring, an air spring, and a cantilever spring.

19. The resonant shaker of claim 1 wherein an amplitude of the modified drive current displaces the armature of the linear drive motor by a predetermined amount.

20. The resonant shaker of claim 1 wherein the controller controls at least one of a frequency and an amplitude of an oscillation of the armature of the linear drive motor.

21. The resonant shaker of claim 1 further comprising a phase detector that is integrated with the controller.

22. The resonant shaker of claim 1 wherein the controller adjusts a frequency of the drive current in response to the predetermined phase relationship between the electrical signal and the drive signal.

23. The resonant shaker of claim 1 wherein the controller modifies at least one of a frequency and an amplitude of the drive current based on a measure of at least one of a viscosity, a mass, a temperature, a PH value, a resistivity, and a conductivity of a specimen that is supported by the support tray.

24. The resonant shaker of claim 1 wherein the sensor is chosen from the group comprising a position sensor, a velocity sensor, a jerk sensor and an accelerometer.

25. The resonant shaker of claim 1 wherein the electrical signal is related to at least one of a displacement of the support tray, a velocity of the support tray, and a jerk of the support tray.

26. The resonant shaker of claim 1 wherein the sensor comprises an optical sensor.

27. A method of shaking using a resonant shaker, the method comprising:
oscillating a support tray of the resonant shaker with a linear drive motor that is driven by a drive current;
generating a drive signal that is related to the drive current;
generating an electrical signal that is related to an acceleration of the support tray;
modifying the drive current in response to a predetermined phase relationship between the electrical signal and the drive signal to generate a modified drive current; and
driving the linear drive motor with the modified drive current to oscillate the support tray.

28. The method of claim 27 further comprising loading a target carrier containing a specimen onto the support tray of the resonant shaker.

29. The method of claim 27 wherein the predetermined phase relationship corresponds to a resonant frequency of movable elements of the resonant shaker.

30. The method of claim 27 wherein the modified drive current controls an amplitude of an oscillation of the support tray.

31. The method of claim 27 wherein the modified drive current controls a frequency of an oscillation of the support tray.

32. The method of claim 27 further comprising displacing the support tray by a predetermined amount.

33. The method of claim 27 wherein the support tray is coupled to the linear drive motor through an elastic element and the predetermined phase relationship comprises an absolute value of a difference in phase between the electrical signal and the drive signal of substantially ninety-degrees.

34. The method of claim 27 wherein the support tray is coupled to the linear drive motor through a rigid coupling and the predetermined phase relationship comprises an absolute value of a difference in phase between the electrical signal and the drive signal of substantially zero-degrees.

35. The method of claim 27 wherein the modifying the drive current comprises adjusting a frequency of the drive current in response to the predetermined phase relationship between the electrical signal and the drive signal.

36. The method of claim 27 wherein the modifying the drive current comprises adjusting at least one of a frequency and an amplitude of the drive current based on a measure of at least one of a viscosity, a mass, a temperature, a PH value, a resistivity, and a conductivity of a specimen that is supported by the support tray.

37. The method of claim 27 wherein the modifying the drive current comprises adjusting at least one of a frequency and an amplitude of the drive current based on a measure of chemical composition of the specimen.

38. A resonant shaker comprising:
a support tray for supporting a target carrier;
a linear drive motor comprising an armature that is coupled to the support tray, the linear drive motor providing an oscillating drive force to the support tray in response to a drive current applied to the linear drive motor; and
a controller that is electrically coupled to the linear drive motor, the controller receiving a signal that is indicative of a measured parameter of the linear drive motor, the controller transmitting a modified drive current to the linear drive motor in response to the signal.

39. The resonant shaker of claim 38 wherein the measured parameter comprises an input impedance of the linear drive motor.

40. The resonant shaker of claim 38 wherein the measured parameter comprises at least one of an input current, input power, and input voltage to the linear drive motor.

41. The resonant shaker of claim 38 wherein the measured parameter comprises at least one of a displacement, a velocity, an acceleration, and a jerk of the armature of the linear drive motor.

42. The resonant shaker of claim 38 wherein the armature is coupled to the support tray through an elastic element.

43. The resonant shaker of claim 38 wherein the armature is coupled to the support tray through a rigid coupler.

44. The resonant shaker of claim 43 further comprising an elastic element that is coupled between the support tray and a housing of the linear drive motor.

45. The resonant shaker of claim 38 wherein the controller controls at least one of a frequency and an amplitude of an oscillation of the armature of the linear drive motor.

46. A resonant shaker comprising:
means for oscillating a support tray with a linear drive motor that is driven by a drive current;
means for generating a drive signal that is related to the drive current;
means for generating an electrical signal that is related to an acceleration of the support tray;
means for modifying the drive current in response to a predetermined phase relationship between the electrical signal and the drive signal to generate a modified drive current; and
means for driving the linear drive motor with the modified drive current to oscillate the support tray.

* * * * *